INVENTOR.
PARVIZ MEHDIZADEH

UNITED STATES PATENT OFFICE
CERTIFICATE OF CORRECTION

Patent No. 3,427,872                         February 18, 1969

Richard W. Leep et al.

It is certified that error appears in the above identified patent and that said Letters Patent are hereby corrected as shown below:

Column 4, lines 22 and 23, "a Barkhausen signal can be generated and disverted" should read -- the variations in the Barkhausen noise level, converted --.

Signed and sealed this 24th day of March 1970.

(SEAL)
Attest:

Edward M. Fletcher, Jr.                     WILLIAM E. SCHUYLER, JR.

Attesting Officer                                    Commissioner of Patents

United States Patent Office 3,427,873
Patented Feb. 18, 1969

3,427,873
CORROSION FATIGUE TESTING APPARATUS
AND PROCEDURE
Parviz Mehdizadeh, Ponca City, Okla., assignor to Continental Oil Company, Ponca City, Okla., a corporation of Delaware
Filed Mar. 30, 1966, Ser. No. 538,739
U.S. Cl. 73—91    2 Claims
Int. Cl. G01n 3/32, 17/00

ABSTRACT OF THE DISCLOSURE

Apparatus and method for determing the behavior of solid materials exposed to a corrosive environment while the solid materials are being flexed comprising: a fluid container means to hold the corrosive fluid, attaching means for fixedly mounting specimens of the solid material in the fluid container means in contact with the corrosive fluid and a reciprocating means which attaches to and flexes the specimens of the solid material during the test period.

---

This invention relates to apparatus and procedure for determining behavior of solid materials exposed to a corrosive environment while under stress. More particularly, the invention relates to such an apparatus and procedure operable for so testing such materials while they are being alternately stressed under either laboratory or field conditions.

In testing materials of construction it is desirable to test them as nearly as possible in the condition of actual anticipated use. It is often difficult to expose the materials simultaneously to the environment of use and the operating stress. It is also often desirable to have a testing procedure that may be used in the field as well as for laboratory evaluation. Thus, testing may be carried out using actual field environment rather than having to synthesize same. For example, fluids produced from or injected into subterranean wells are often corrosive to the well equipment with which they come into contact. The corrosive fluid, which may be gaseous, liquid or a mixture thereof, is difficult to collect and transport to a laboratory for testing without undergoing alteration. This corrosivity may be accentuated by the stresses under which the well equipment operates, such as repeated alternating stresses or fatigue conditions under which sucker rods operate.

It is well known that the performance of materials of construction under repeated cyclical loading is governed by the phenomenon of fatigue. Under such conditions, the materials tend to fail at stresses far below those characterizing their normal mechanical properties. Fatigue strength in the presence of a corrosive media, known as corrosion fatigue, is an important design criterion for components of equipment used in corrosive environments. Under noncorrosive atmospheric conditions most materials of construction exhibit a limiting stress below which the material could be cyclically stressed indefinitely without failure. This stress is called the endurance or fatigue limit. Under corrosion fatigue conditions there is no endurance limit. The corrosion fatigue limit is normally defined as the maximum value of stress at which no failure occurs after a large number of cycles, usually $10^7$.

It is believed that two major processes take place in the course of corrosion-fatigue failure: first, a physical process by which the external load forces atomic movements within the material causing changes in structure and properties, second, an electrochemical process by which the material interacts with the environment. This latter process contributes to failure by removal of material at the surface, causing pits and surface cracks, and/or assistance in crack propagation by constantly working at the root of the surface cracks where high stress concentration exists. Thus, corrosion-fatigue failure is characterized first by cracking of the material followed by breaking apart if the crack propagates far enough.

Standard corrosion tests involve exposure of a specimen of the solid material being tested to a corrosive environment for a certain period of time followed by examination of the specimen for possible change, such as weight loss, pitting, change in surface appearance, etc. Such tests are useful but not entirely representative of the behavior of the materials in service, especially where the material is under stress while in service. It is known to conduct tests under dynamic conditions, e.g., where the corrosive media is flowed past the specimen or the specimen is moved as being rotated while exposed to the corrosive media. Various procedures are also known for testing materials under conditions of fatigue, such as rapidly rotating a wire specimen bent into an arc or a cantilever specimen weighted at two points. Since many materials of construction are not available in wire form, the rotating wire test is not entirely satisfactory. The rotating cantilever beam apparatus is difficult if not impossible to use under anerobic conditions and is not readily adaptable to field use.

It is an object of this invention to provide an apparatus and method for testing the effect of corrosive media on solid materials under conditions of alternating stress. It is a further object to provide apparatus and method for conducting such tests in the field. It is a still further object to provide apparatus and method for repeatedly cyclically flexing specimens of a solid material which is exposed to a controlled environment. It is another object to provide an apparatus and method for fatigue testing materials used in oil field exposed to well fluids at the wellhead. It is another object to provide apparatus and method for determining the fatigue limit of the materials of construction under various conditions. Other objects, advantages and features will become apparent from the following description read in conjunction with the drawings and claims.

The above and related objects are realized by an apparatus for determining susceptibility of materials of construction to corrosion fatigue comprising a fluid container means adapted to hold a corrosive fluid and equipped with means for mounting therein one end of specimens of material of construction. A reciprocating means is also mounted in the fluid container means and clamped or fixedly attached in a sliding arrangement to the specimen at a point remote from the end mounted on the fluid container means. A fluid corrosive environment is passed into the fluid container means to contact at least the gauge portion of the specimen. The reciprocating means is activated by a drive force means so as to cyclically stress, oscillate, vibrate, or flex the test specimen back and forth. The test is continued for any desired length of time or until the specimen cracks or breaks. In a preferred embodiment the corrosive fluid is passed through the fluid conductor means and over the specimens throughout the test period. In another preferred embodiment the apparatus is a closed system and built to withstand operating pressures and temperatures of corrosive systems. The invention will be better understood when considered in connection with the accompanying drawings.

FIGURE 2 is a sectional view of the apparatus of this invention taken along cutting plane line a–a' of FIGURE 1.

Figure 1:
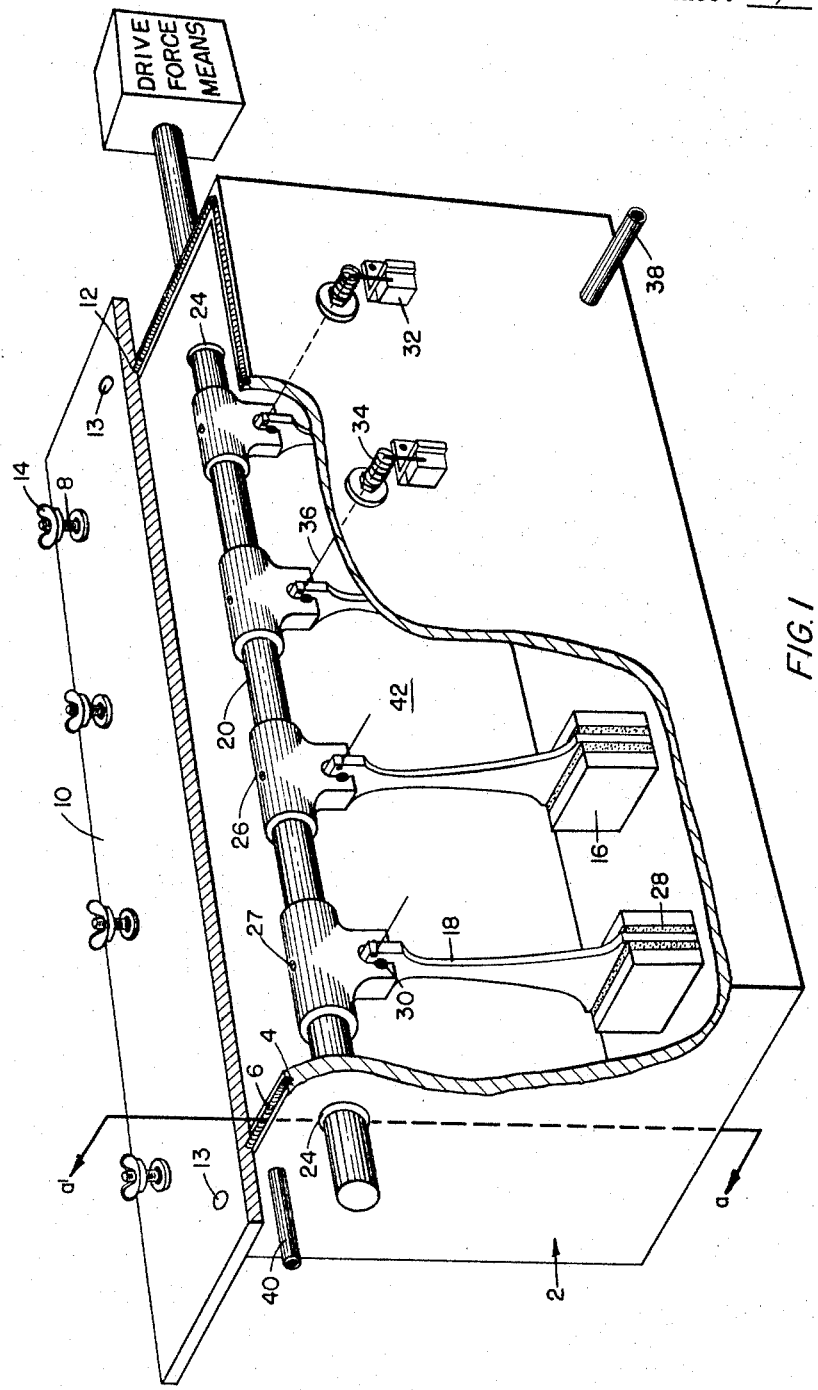
FIGURE 1 is a perspective view in partial cross section of the apparatus of this invention.

In FIGURE 1, the fluid container means comprises tank 2 having groove 4 around the top edge thereof adapted to receive O ring 6 and a plurality of bolts 8 welded around the top of tank 2 and extending upwardly therefrom. Lid 10 is provided with matching groove 12 to receive the top half of O ring 6. Lid 10 extends over the edges of tank 2 and is provided with holes 13 through which bolts 8 are fitted. When lid 10 is positioned on top of tank 2 and bolted thereon with wing nuts 14, a pressure-tight seal is effected. Along the bottom of tank 2 are fixed, as by welding, one or more first clamping means 16. One end of specimens 18 of the material of construction is fixed in first clamping means 16. Mounted across the upper part of tank 2 and above specimens 18 is reciprocating means 20. One end of reciprocating means 20 passes through tank 2 with packing gland 24 therebetween providing a pressure tight seal. This end of reciprocating means 20 is attached to a drive force means 30 (shown in block form), such as a motor driven eccentric, to provide reciprocating motion. Similarly, the other end of reciprocating means 20 passes through the opposite end of tank 2 with packing gland 24 therebetween. Rigidly mounted along reciprocating means 20 over each specimen 18 are holders or second clamping means 26 positioned along reciprocating means 20 by set screws 27 and adapted to receive the upper end of specimen 18. Specimens 18 are electrically insulated from tank 2, first clamping means 16 and second clamping means 26 by using nonconductor insulating material 28 and 30 between each specimen 18 and these members. Preferably, each specimen 18 is attached to timer-counter means 32 which records the number of flexes which each specimen 18 undergoes before development of a crack or complete failure. In one embodiment of timer-counter means 32, spring 34 loaded wire 36 is attached to specimen 18 near the top thereof. The amount of spring 34 loading may be varied so that electric contact is broken, thus stopping the count, when specimen 18 cracks or when a complete break has occurred thus releasing tension on the wire.

In another preferred embodiment, tank 2 is provided with a fluid inlet 38 on one side and a fluid outlet 40 remotely located on another side so that fluid 42 may be passed through tank 2 and over specimens 18 during the test.

In FIGURE 2, the apparatus is shown in cross section to show additional details of one embodiment of first clamping means 16, second clamping means 26, packing glands 24 and nonconductor insulating material 28 and 30. In this embodiment, sheet nonconductor insulating material 28 holds specimen 18 rigidly in first clamping means 16 whereas glass rods 30 electrically isolate specimen 18 from second clamping means 26 and provide a snug hold or pressed fit in the direction of the reciprocating motion, i.e., direction of flexing or vibration, but leave the specimen free to move in the direction transverse or normal to the direction of the reciporcating motion. Thus, when specimen 18 breaks during the test, the top portion thereof is free to fall out of second clamping means 26.

Figure 3:
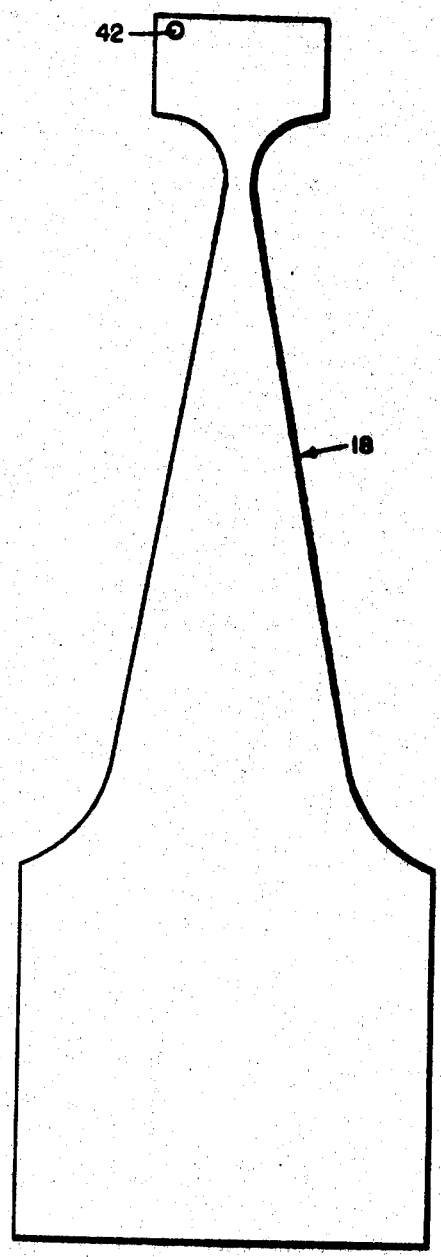
FIGURE 3 is a side view of a specimen of a material of construction.

FIGURE 3 shows one type of specimen 18 of a material of construction which may be used in the practice of this invention. Hole 42 in the upper portion of specimen 18 is used to attach wire 36 running to timer-counter device 32, as shown in FIGURE 1. With this shape of sample 18, breaking or cracking will occur in the triangular or gauge portion of the specimen.

The procedure for using the above-described apparatus is to position the specimens and test fluid as detailed above, attach the lid (if one is used) and actuate the drive force attached to the reciprocating means. In using the apparatus in the field, as in testing materials of construction for susceptibility to corrosion fatigue when exposed to fluids either being produced from or injected into wells, the fluid is withdrawn from the conduit attached to the wellhead, flowed through the fluid container and then either returned to the conduit, recycled or discarded. In carrying out such field testing the fluid container means and reciprocating means must often be supplied with pressure seals or packing glands as the fluids are often under considerable pressure.

It is to be understood that the above description is of a preferred embodiment of the invention wherein a pressure differential may be established between the interior and exterior of the apparatus. If there is no desire to perform the tests under a pressure differential, all pressure seals, lid and attaching paraphernalia can be omitted.

The fluid container means may be a hollow vessel of any shape of suitable size for insertion therein of test specimens. Convenient shapes include a rectangular box and a cylinder. Preferably, such means is capable of withstanding pressure and temperature differentials such as those between the pressure and temperature which might commonly be encountered in using materials of construction and atmospheric conditions. The fluid container means can also be insulated, heated or cooled as desired using standard techniques. If desired, the fluid container means may be provided with a fluid inlet and a fluid outlet so that the corrosive fluid can be passed therethrough and over the specimens. This latter embodiment is especially useful in field testing where a sample of corrosive fluid can be withdrawn from a system, passed through the fatigue testing apparatus and returned to the system, as by providing a side loop along a conduit carrying the corrosive fluid.

The material of construction used in the fluid container means and other parts of the apparatus to which the test fluid is exposed should be some material which is inert to the fluid being tested.

The specimens of material of construction may be of any solid material and of any shape. Of particular interest are metals. However, polymeric or other solid materials may also be tested. Commonly used specimens are flat plates with the largest surface area being cut in triangular shape. The triangle portion provides a gauge area, i.e., area over which cracking or breaking is expected to occur. Rods, rectangular plates or other shapes may also be employed.

Either the first clamping means containing the specimen at the bottom thereof, or the second clamping means, i.e., holder, containing the specimen at the top thereof or both should grip the specimen tightly in a firm grip. However, the apparatus may be used with one of either the first or second clamping means confining the specimen only in the direction of the reciprocating motion, i.e., a sliding arrangement. This allows part of the specimen to move transverse or normal to the direction of movement of the reciprocating means when a crack or break in the specimen develops. Such an arrangement is especially helpful when using the timer-counter means described above.

When the specimen of material of construction being tested, fluid container means, first clamping mans and second clamping means are metal, it is necessary to provide an electrical insulation material at points where the specimen would otherwise contact these members. This prevents possibility of accelerated corrosion due to a galvanic cell being set up. Suitable insulators include rubber, plastics, glass rods and the like.

The reciprocating means may be of any material and design capable of translating reciprocal motion from the drive force means to the test specimens. Suitable materials include metal rods or bars slidably mounted in the fluid container means to grip the test specimen at a point remote from the end of the specimen held by the clamp rigidly mounted in the fluid conductor means. Movement of the reciprocating means is achieved by providing a hollow receptacle or cap on one side of the fluid conductor means into which one end of the reciprocating means slidably fits. This hollow receptacle can extend through the side of the fluid conductor means or can be mounted completely within the same. Alternately, the hollow receptacle may be eliminated and the reciprocating means extended through the side of the fluid container means with a packing gland therebetween. The other end of the reciprocating means extends through the side of the fluid conductor means and attaches to the drive force means. To facilitate the freedom of movement of the reciprocating means, it is preferred to employ a packing gland or pressure seal in the side of the fluid container means around the reciprocating means. If the apparatus is to be used under a pressure differential, the packing gland is required. If the hollow receptacle is employed and extends through the side of the fluid container means, a packing gland is used around this member as well. Suitable types of packing include sliding contact packing such as a series of V-shaped gaskets or diaphragm packing such as a bellows arrangement.

Laboratory examples

The apparatus of FIGURES 1, 2 and 3 using a Monel tank and lid was employed. The rectangular tank had a length of 22½", a width of 10½", and a height of 13¼". Test specimens were cut into a triangle shape with a rectangular area on each end for gripping with the clamp and holder as shown in FIGURE 3. The specimens were normalized at 1600° F. After machining the specimens were hand polished on a cloth wheel to produce a mirror finished surface. The specimens had a thickness of 0.075", overall length of 9 1/16", height of base of 2½", height of triangular or gauge portion of 5 9/16", width of base 3", and width of top rectangular portion of 1¼". A 3/32" diameter hole was drilled in the top rectangular portion near the edge thereof. Specimens were mounted in the apparatus as has been described above. The system was then calibrated for various stresses by using as fatigue specimen with a strain gauge attached to each side thereof and varying the length of stroke of the reciprocating means.

Fatigue data for air as the environment was determined using a cycling frequency of 600 cycles/min. for $1 \times 10^7$ cycles or until failure occurred and at various stress values. The results given in Table I show the corrosion fatigue limit of AISI 1035 carbon steel was found to be 29,340 p.s.i. which agrees closely with the published value of 30,000 p.s.i. for this metal.

TABLE I

| | Corrosive Environment | Stress (p.s.i.) | Cycles to Failure (average of 2 or more specimens) |
|---|---|---|---|
| Example: | | | |
| 1 | Air | 55,200 | $5.8 \times 10^4$ |
| 2 | Air | 45,680 | $3.73 \times 10^5$ |
| 3 | Air | 38,730 | $1.45 \times 10^6$ |
| 4 | Air | 34,020 | $2.96 \times 10^6$ |
| 5 | Air | 29,340 | $1 \times 10^7$ (no failure) |

The same procedure was repeated to find the endurance limit for various aqueous based environments. The salt water used contained 57,000 p.p.m. total solids, made up of 34,400 p.p.m. chloride ion, 22,200 p.p.m. sodium ion, 24 p.p.m. magnesium ion, 112 p.p.m. calcium ion, 92 p.p.m. sulfate ion, and 172 p.p.m. unidentified. Deaeration was accomplished by bubbling through the salt solution warm nitrogen gas which had been passed over hot copper chips. Salt solutions were saturated with various gases by bubbling the gas through the salt water for several hours prior to using and maintaining a positive pressure of the gas or gases over the solutions throughout the test. The amount of liquid used, 24 to 28 liters, completely immersed the specimens. The results of these tests are given in Table II. The results show that definite differences in the fatigue limit of metal exposed to the various environments could be detected using the apparatus of this invention.

TABLE II

| Example | Corrosive Environment | Estimated Gas Content (p.p.m.) | Endurance Limit (at $10^7$ Cycles) (p.s.i.) | Relative Decrease in Stress (percent) | Corrosive Action |
|---|---|---|---|---|---|
| 6 | Air | | 29,000 | 0 | Normal air corrosion. |
| 7 | Deaerated salt water | $<0.1$ $O_2$ | 30,000 | 0 | Very mild corrosion. |
| 8 | Salt water saturated with $H_2S$ | 3,000 $H_2S$ | 23,000 | 20 | Cracking and hydrogen blisters. |
| 9 | Salt water saturated with $CO_2$ | 2,000 $CO_2$ | 17,000 | 41 | Multiple surface cracking. |
| 10 | Salt water saturated with $CO_2$ and air | 1,200 $CO_2$, 3 $O_2$ | 17,000 | 41 | Excessive surface cracking. |
| 11 | Salt water saturated with $H_2S$ and air | 2,000 $CO_2$, 3 $O_2$ | 15,000 | 48 | Pitting, severe corrosion, cracking. |
| 12 | Salt water saturated with $H_2S$ and $CO_2$ | 70 $H_2S$, 40 $CO_2$ | 41,000 | 62 | Pitting and surface cracking. |
| 13 | Aerated salt water | 7 to 8 $O_2$ | 10,000 | 65 | Severe corrosion pitting. |

Frequent sucker rod breaks have been experienced in wells in the Griffin Field, White County, Indiana. Well A in this field produces 34 barrels oil per day and 134 barrels water per day. Well B produces 72 barrels oil per day and 193 barrels water per day. Corrosion fatigue tests were made similar to those described above using fluids from these wells mixed in the same volume ratio as they were produced. Comparison was made with a laboratory synthesized environment of a mixture of salt water and diesel oil saturated with gas mixture of hydrogen sulfide, nitrogen, and carbon dioxide. In these tests using two immiscible fluids, the test solution was continually agitated. The tests results are given in Table III.

TABLE III

| | Corrosive Environment | Estimated Gas Content (p.p.m.) | Cycles to Failure (average of 2 or more specimens) |
|---|---|---|---|
| Example: | | | |
| 14 | Produced fluids from Well A | 22, $H_2S$; 11, $CO_2$ | $2.45 \times 10^6$ |
| 15 | Produced fluids from Well B | 42, $H_2S$; 27.5, $CO_2$ | $1.21 \times 10^6$ |
| 16 | 50:50 mixture of diesel fuel and salt water saturated with $H_2S$, $CO_2$ and $N_2$. | 70, $H_2S$; 240, $CO_2$ | $0.6 \times 10^6$ |

These tests show that specimens exposed to these well fluids are susceptible to corrosion fatigue and that differences in similar environments can be detected with the apparatus of this invention. The shorter corrosion fatigue life in the synthesized environment was due to its more severe corrosivity with respect to field fluids as may be estimated from the gas contents.

Field examples

A well in the San Miguelito Field, Ventura County, California, produced 16 barrels per day oil and 125 barrels per day water. The well head pressure was 85 p.s.i.g. The flow of well fluids was diverted through a U or side loop placed between the well head and the production tubing. The U contained the test apparatus of this invention. The apparatus of FIGURES 1 and 2 was modified by adding cross braces or strength members to the tank and lid to enable the apparatus to withstand a pressure differential of up to 100 p.s.i. The test procedure was the same as that used in the preceding examples, except that a stress level of 32,000 p.s.i. was employed. A test made on the natural well fluids results in a total of $2.36 \times 10^6$ cycles to failure (average of 3 specimens). Then the effectiveness of a corrosion inhibitor was determined as follows. Seven quarts of an inhibitor, comprised of 25 parts by weight fatty amide, 25 parts quaternary ammonium chloride, and 50 parts isopropanol, was dumped into the casing-tubing annulus of this well and flushed down hole with 40 gallons water. The well fluids were circulated down the annulus, up the tubing and through the test apparatus with specimens in place but not being flexed for 24 hours. The well was then produced through the test apparatus for 24 hours. At this time, cycling of the specimens was begun. A total of $4.27 \times 10^6$ cycles to failure (average of 4 specimens) was found. Thus, the average life of the specimens subjected to the inhibitor treatment was about twice the average life of the specimens that did not receive inhibitor treatment. Since the test specimens in the corrosion fatigue apparatus were subjected to the same environment as other equipment in the well, it may be concluded that the average life cycle of other parts, such as sucker rods and pump parts, subjected to cyclic loading in this well has been increased accordingly by the inhibitor treatment.

The apparatus and procedures of this invention can be used to determine:

(a) the effectiveness of various corrosion inhibitors in certain well fluids, (b) the best type of corrosion inhibitor treatment to be used on a well, and (c) the corrosivity of well fluids relative to corrosion fatigue.

As will be apparent from the above description, many modifications and variations of the invention hereinbefore set forth may be made without departing from the spirit and scope thereof. The examples are given by way of illustration only, and the invention is limited only by the terms of the appended claims.

I claim:

1. An apparatus for determining the susceptibility to corrosion fatigue of metal specimens comprising:
   (a) an open-topped rectangular tank having a fluid inlet on one end thereof and a fluid outlet on the other end thereof,
   (b) one or more first clamping means attached to and spaced along the bottom of said tank for the fixedly mounting therein of said metal specimens,
   (c) a reciprocating means mounted in said tank above and in a plane parallel to the top ends of the metal specimens,
   (d) one or more second clamping means fixedly attached to the reciprocating means and adapted to grip the top end of the metal specimens in a pressed fit in the direction of reciprocating motion but allowing free movement in the direction normal to the direction of reciprocating motion,
   (e) drive force means for moving the reciprocating means in an alternating back and forth manner,
   (f) a pressure-tight fitting lid complementary to the top of the tank,
   (g) attaching means for securing the lid to the tank, and
   (h) timer-counter means to record the number of flexes given to each specimen during the test period.

2. An apparatus for determining the susceptibility to corrosion fatigue of metal specimens comprising:
   (a) a fluid container tank having an opening therein through which said metal specimens may be passed, a fluid inlet on one end thereof and a fluid outlet on the other end thereof,
   (b) one or more spaced first clamping means attached to the interior of said tank for the fixedly mounting therein one end of said metal specimens,
   (c) a reciprocating means mounted in said tank in a plane parallel to and beyond the ends of the metal specimens which ends are opposite the ends fixedly mounted in said first clamping means whereby to flex the specimens in a direction perpendicular to said ends,
   (d) one or more spaced second clamping means fixedly attached to the reciprocating means and adapted to grip the said opposite end of the metal specimens in a pressed fit in the direction of reciprocating motion but allowing free movement in the direction normal to the direction of reciprocating motion,
   (e) drive force means for moving the reciprocating means in an alternating back and forth manner,
   (f) a pressure-tight fitting cover complementary to the opening in the tank,
   (g) attaching means for securing said cover to the tank, and
   (h) timer-counter means to record the number of flexes given to each specimen during the test period.

References Cited

UNITED STATES PATENTS

| | | | |
|---|---|---|---|
| 3,170,321 | 2/1965 | Sullivan et al. | 73—103 X |
| 1,485,835 | 3/1924 | Bothezat et al. | 73—91 |
| 2,245,269 | 6/1941 | Gilbert | 73—15.6 X |

FOREIGN PATENTS 600,271   4/1948   Great Britain.

OTHER REFERENCES

A. W. Garst: Inhibitor for Aerated Sea Water. Mohole, U.S. Gov. Res. & Develop. Rep., vol. 440, No. 11, June 5, 1965, pace S-5.

RICHARD C. QUEISSER, *Primary Examiner.*

C. I. McCLELLAND, *Assistant Examiner.*

U.S. Cl. X.R.

73—86